July 5, 1960 O. M. STUETZER 2,944,165

SEMICONDUCTIVE DEVICE POWERED BY LIGHT

Filed Nov. 15, 1956

INVENTOR.
OTMAR M. STUETZER
BY Wade Koontz
ATTORNEY

United States Patent Office 2,944,165

Patented July 5, 1960

2,944,165

SEMICONDUCTIVE DEVICE POWERED BY LIGHT

Otmar M. Stuetzer, Hopkins, Minn., assignor to the United States of America as represented by the Secretary of the Air Force Filed Nov. 15, 1956, Ser. No. 622,505

2 Claims. (Cl. 307—88.5)

(Granted under Title 35, U.S. Code (1952), sec. 266)

The invention described herein may be manufactured and used by or for the United States Government for governmental purposes without payment to me of any royalty thereon.

The invention relates to an electrical circuit for semiconductive devices which make use of the photovoltaic effect to supply the power and the biases to the semiconductive device.

Another object is to achieve a considerable saving in wiring and decoupling components in complex equipment using semiconductive devices.

Another object is to achieve a saving of weight and space by generating within the semiconductive device all of the voltages needed to energize the device.

These and other objects are accomplished by illuminating certain junctions to produce the power and biases needed and by spacing certain junctions so that they act as high impedance which can be used as load resistance. This load resistance can be designed within several orders of magnitude by selecting the lifetime of the carriers, and can be decreased by introducing surface conductivity by any of the many well known methods.

Fig. 1 of the drawing illustrates a grounded emitter transistor circuit having three power connections with bias reducing and decoupling means.

Figure 1:
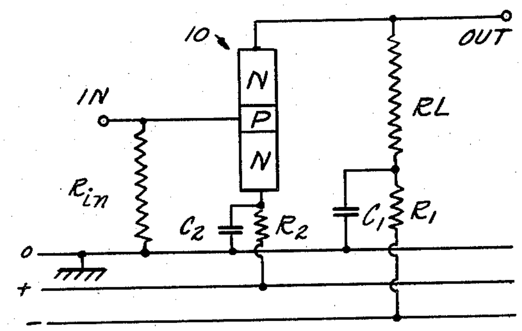

Referring to Fig. 1 which shows the usual grounded emitter type transistor circuit wherein the input signal is applied to the base electrode the transistor 10 is supplied with power and bias from a supply which may be common to other stages. $R_1$, $C_1$ and $R_2$, $C_2$ are used to reduce the biases to the requirements for the particular stage and also to decouple the stage from the other stages. The input electrode is marked IN in all of the figures and the output electrode is marked OUT in all of the figures.

Figure 2:
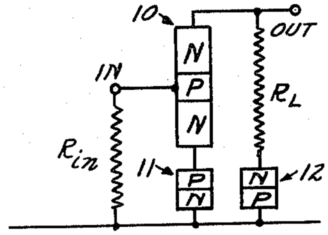
Fig. 2 shows a device corresponding to the device of Fig. 1 wherein illuminated junctions are used as power and biasing sources.

With the device of Fig. 2, which corresponds to the device of Fig. 1, the power is supplied by PN junctions 11 and 12. Under illumination the P part of the junctions becomes positive and since the impedance is low no shorting capacitance will be necessary.

Figure 3:
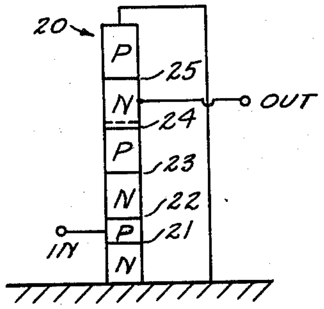
Fig. 3 shows a device corresponding to the device of Fig. 2 wherein the semiconductive device and power and bias sources are incorporated into a single bar.

Fig. 3 shows a device 20 corresponding to the device of Figs. 1 and 2 wherein elements corresponding to 10,

11 and 12 of Fig. 2 are incorporated into a single block having alternate regions of N-type and P-type conductivity. Junction 21 is illuminated and produces the emitter biasing current. Illumination of junctions 23 and 25 furnish energy to the collector. Junctions 22 and 24 are therefore biased in the reverse direction. Since junction 22 is located very near the illuminated emitter junction 21 it acts as a collector junction. Junction 24 however is spaced from illuminated junctions 23 and 25 by more than one diffusion length of the carriers in the material and therefore acts as a high impedance which may be used as a load impedance.

Figure 4:
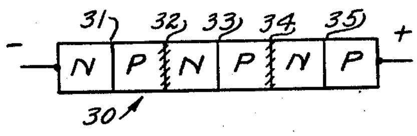
Fig. 4 shows a plurality of NP junction photodiodes incorporated into a single bar with the high impedance junctions short circuited.

Fig. 4 illustrates a device with a plurality of alternate zones of N-type and P-type semiconductivity which can be connected together and illuminated to produce different photovoltages. In this device alternate junctions 31, 33 and 35 are illuminated. The unilluminated junctions 32 and 34 will therefore be biased in the reverse direction and will have a high impedance. This high impedance can be short circuited by providing a metal layer on the surface to reduce the impedance of the voltage source as shown in the drawing.

Figure 5:
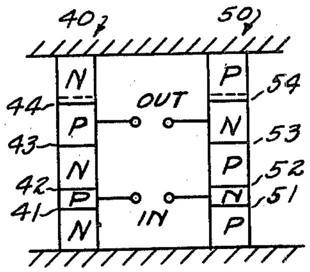
Fig. 5 shows another embodiment wherein an NPN device and a PNP device are connected together to represent a symmetric amplifier and wherein the energizing method of the invention is used.

While the devices illustrated thus far have been of the NPN type it can be seen that illumination of the emitter junction of a PNP type device also leads to the right bias. Fig. 5 shows how the NPN and PNP type of devices correspond to each other. In this figure devices 40 and 50 are connected as a symmetric amplifier with electron flow in 40 corresponding to hole flow in 50. In this device junctions 41, 43, 51 and 53 are illuminated.

Figure 6:
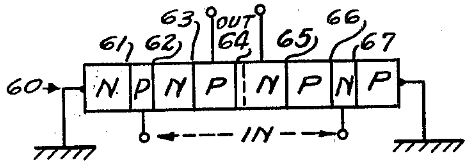
Fig. 6 shows the device of Fig. 5 incorporated into a single bar.

Fig. 6 illustrates the device of Fig. 5 incorporated into a single bar with junctions 61, 63, 65 and 67 illuminated, junction 62 is a collector of electrons, junction 66 collects holes and junction 64 constitutes a high impedance output.

Figure 7:
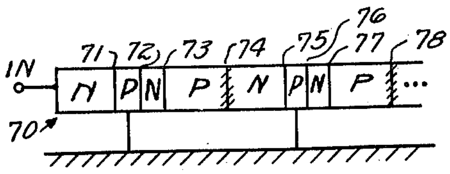
Fig. 7 illustrates a "hook" amplifier system to which the energizing method of the invention has been applied.

Fig. 7 shows how the energizing method of the invention may be applied to a "hook" amplifier. Junctions 71, 73, 75 and 77 are illuminated. Any number of amplifiers can be cascaded in a single bar by short circuiting the connecting PN junctions, such as at 74 and 78. Short circuiting metal layers are provided on the surface as shown in the drawing.

Any method for providing the needed illumination may be used, for instance, the whole surface may be illuminated and the high impedance junctions may be provided with an opaque coating or light may be directed onto the junctions by optical means such as cylindrical lens. Cooling of the whole system will increase the photovoltages.

There is thus provided means for making use of the photovoltaic effect by illuminating certain junctions within a semiconductor to supply power and bias thereto.

While the invention has been described with reference to certain particular embodiments, it will be understood that numerous changes may be made without departing from the general principles and scope of the invention.

I claim:

1. A semiconductive device having a plurality of alternate regions with opposite types of conductivity, said device having an emitter junction, a collector junction, an input electrode, a load junction and two additional junctions, means for illuminating the emitter junction and the two additional junctions to provide power and bias to said device, said input electrode being connected to a region having one conductivity and an output means connected to a region having the other type of conductivity.

2. An NPN junction type semiconductive device having a semiconductive means with at least two junctions connected to one end thereof, means for illuminating a plurality of said junctions to provide power and bias for said device, one of said two junctions being unilluminated and spaced from two adjacent illuminated junctions by a distance greater than one diffusion length of the carriers in the material, said unilluminated junction being connected in the load circuit of said device, an input means connected to the P region of the NPN semiconductive device, an output circuit connected to an N type region adjacent said unilluminated junction.

References Cited in the file of this patent

UNITED STATES PATENTS

| | | |
|---|---|---|
| 2,569,347 | Shockley | Sept. 25, 1951 |
| 2,588,254 | Lark-Horovitz et al. | Mar. 4, 1952 |
| 2,655,610 | Ebers | Oct. 13, 1953 |